(12) United States Patent
Wongprasertphon

(10) Patent No.: US 11,279,525 B2
(45) Date of Patent: Mar. 22, 2022

(54) BAG WITH HANDLE

(71) Applicant: Future Flex Co., Ltd., Samutsakhon (TH)

(72) Inventor: Pornchai Wongprasertphon, Samutsakhon (TH)

(73) Assignee: Future Flex Co., Ltd., Krathumbaen (TH)

( * ) Notice: Subject to any disclaimer, the term of this patent is extended or adjusted under 35 U.S.C. 154(b) by 0 days.

(21) Appl. No.: 16/274,922

(22) Filed: Feb. 13, 2019

(65) Prior Publication Data
US 2019/0389627 A1  Dec. 26, 2019

(30) Foreign Application Priority Data

Feb. 14, 2018 (TH) .............................. 1801000893

(51) Int. Cl.
 *B65D 33/10* (2006.01)
 *B65D 33/08* (2006.01)
 *B65D 33/25* (2006.01)

(52) U.S. Cl.
 CPC ............. *B65D 33/10* (2013.01); *B65D 33/08* (2013.01); *B65D 33/2508* (2013.01)

(58) Field of Classification Search
 CPC ..... B65D 33/10; B65D 33/08; B65D 33/2508
 USPC ...................................................... 383/9, 10
 See application file for complete search history.

(56) References Cited

U.S. PATENT DOCUMENTS

| 3,592,379 A * | 7/1971 | Nakamura | A45C 3/04 383/6 |
| 4,813,792 A * | 3/1989 | Belmont | B65D 33/28 383/13 |
| 4,878,764 A * | 11/1989 | Meyer | A45C 3/04 383/72 |
| 5,716,137 A * | 2/1998 | Meyer | B65D 31/04 383/10 |
| 7,137,737 B2 * | 11/2006 | Schneider | B65D 33/28 383/75 |
| 9,387,957 B2 * | 7/2016 | Fraser | B65F 1/0006 |
| 9,550,610 B2 * | 1/2017 | Kent | B65D 33/28 |
| 9,637,278 B2 * | 5/2017 | Borchardt | B65D 31/02 |
| 2007/0071370 A1 * | 3/2007 | Schneider | B65D 33/02 383/119 |
| 2011/0075952 A1 * | 3/2011 | Mallory | B65F 1/0006 383/75 |

(Continued)

FOREIGN PATENT DOCUMENTS

WO    2013/180669 A1  12/2013

*Primary Examiner* — Peter N Helvey
(74) *Attorney, Agent, or Firm* — Sterne, Kessler, Goldstein & Fox P.L.L.C.

(57) ABSTRACT

A bag with handle and method for producing the bag that incorporates the features of four seal bag body with a new handle part to obtain a new bag with a durable bag body that can carry a heavy load, can be stacked in high number without falling, consume less space in storage and transportation, has large front space and side spaces for product information display while on shelf, that is convenient to hold, strong and secure, that does not cut fingers in use, and that may be applied to shopping bags or reusable or resealable packaging bags. The concept of the method of producing said bag is steps of folding, assembling, and sealing a plurality of sheet materials which are not obvious to a person ordinarily skilled in the art.

12 Claims, 4 Drawing Sheets

(56) References Cited

U.S. PATENT DOCUMENTS

2015/0238372 A1\* 8/2015 Bhattacharjee ..... A61F 13/5511
383/10

\* cited by examiner

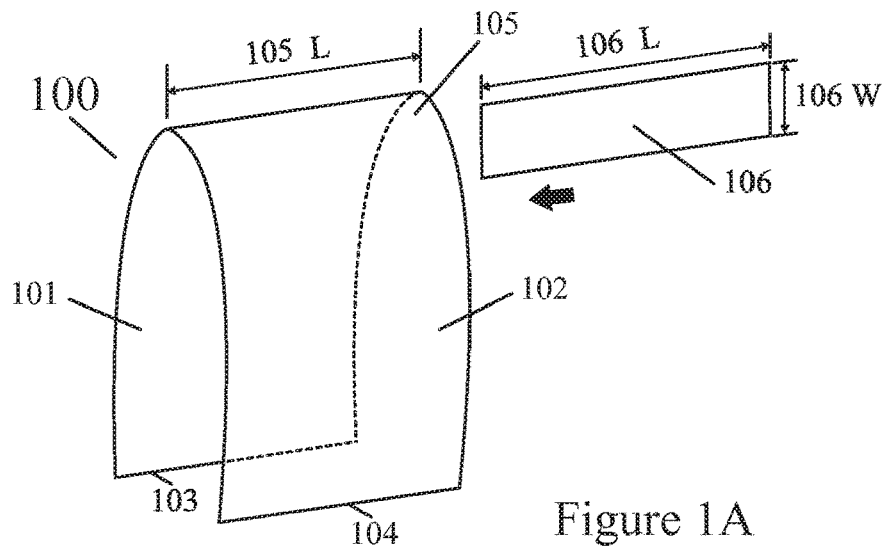
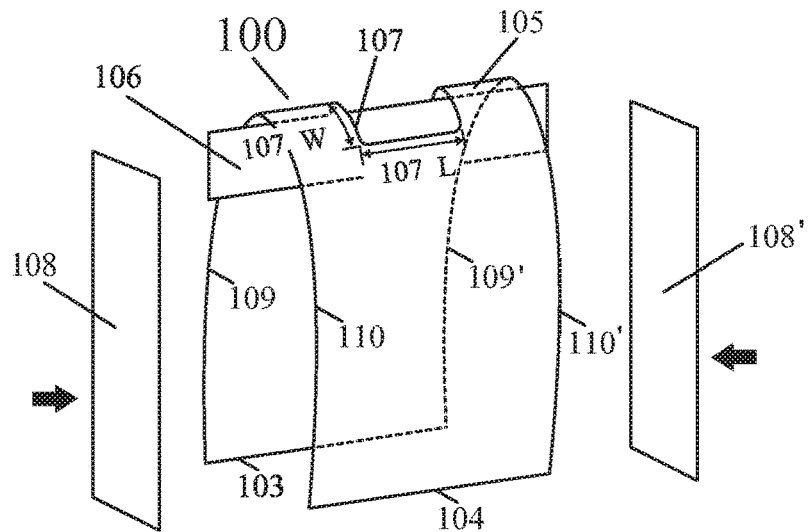
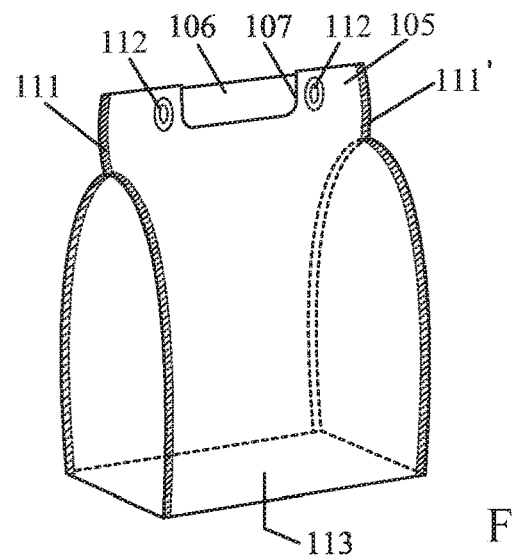
Figure 1A
Figure 1B
Figure 1C

BAG WITH HANDLE

CROSS-REFERENCE TO RELATED APPLICATION

This application claims the benefit of Thai Patent Application No. 1801000893, filed on Feb. 14, 2018, which is incorporated herein by reference in its entirety.

FIELD OF THE INVENTION

This invention relates to the industrial manufacturing of bag with handle.

BACKGROUND OF THE INVENTION

The shapes of bags for containing products as seen on shelves in conventional retail stores are directly important for storage space management, logistics or display, aesthetic aspect, orderliness, and informative display of the products when positioned on the shelf, convenience, durability, package holding and carrying safety of the buyers, and product preservation after the bag's first opening and a portion of the product is taken. Therefore, product bags satisfying even parts of the above requirements have high economic values particularly for products manufactured or prepared and packed using industrial methods, which need a large amount of said bags.

Prior art product bags were manufactured to satisfy the above requirements in separate parts. The bag product developments may be divided into two fields i.e. the foci on the body part and the handle part.

The body of the bag is the larger part, therefore, it relates mostly to storage space, logistics, and product display. The bag body directly contains the product and also displays product information to the consumers on the retail shelf. The prior art bag bodies that best satisfy said requirements are rectangular bag bodies with lateral ridges, a flat bottom, and sealed four sides also known in the art as four seal bags which are strong, can carry a heavy load, can stand upright, can be stacked in high number without falling, produce less unused spaces in storage and on shelf, contain large blank spaces on the front and lateral sides for product information display e.g. a brand name and ingredients displays, and can display information even on the lateral sides or the ridges without a blind spot no matter how the product is positioned on the shelf.

The prior art handles varied but all of them possesses similar usage limitations. Particularly, when they are used to carry the bag bodies with a heavy load (e.g. rice), since the handles are not strong, they often break during carrying even if they are made of the same material as the bag body. If they are made of stronger materials than the bag body, the breakage tends to occur near the connection between the two types of material and the product may be dropped and damaged. The handles produced from strip shaped materials may also cut the holder's fingers.

Some types of prior art bags for containing a product configured to be tightly re-closable and re-openable for several times after the first opening by the consumer are known in the art as re-sealable bags. These types of bag are widely used as they can well preserve the product. After the first opening, if all of the product is not consumed, it's not necessary to transfer the product left to another closed container and the bags may be reused after the product is used up.

International Patent Application Publication document No. WO 2013/180669 A1 disclosed a bag with handle characterized in that the handle's structure can carry a heavy load and the handle do not cut the holder's fingers. However, the folding and assembling methods of sheet materials for producing the bag with handle according to the Publication are limited to only the bags without the edge's thickness. Thus, the four seal bag cannot be produced with the handle having said characteristics. Therefore, the problem exists since the handle according to the Publication was invented to carry a heavy load but it is not compatible with the four seal bag that must be able to carry a heavy load. In addition, the bags with the handle according to said Publication does not have advantages as the four seal bag does (e.g. stackability or blank spaces for product information display as mentioned above).

In the related art, technical features and limitations of known bags and handles are recognized and there are continuous efforts to achieve a product bag that overcomes the limitations and incorporates the above-mentioned characteristics to satisfy the needs of sellers, logistic providers, and consumers with one type of bag and it must also be able to be manufactured using industrial processes.

SUMMARY OF THE INVENTION

The present invention aims to overcome the limitations and incorporate technical characteristics of product bag that are preferable to sellers, logistic providers, and consumers to respond to the existing demands of the market that was never satisfied since no one in the art can achieve the bag that satisfy these demands and can be manufactured using industrial processes.

The concept of the present invention is to be applied with the product bag with handle produced using sheet material, which would solve the problems and possess all the above-mentioned features. The method is to integrate a plurality of one or more types of sheet materials into a single bag using folding, assembling, and sealing, which is not obvious to a person ordinarily skilled in the art. The objective is to obtain a four seal bag with a strong, convenient handle that does not cut the holder's hand that has all other preferable characteristics of the same type of bags. The bag according to the present invention comprises different elements from the previously known bags, has distinctively better technical characteristics, and is produced by a method that can be applied to a plant for mass, continuous manufacturing.

The same concept can also be applied with bags with handle not for retail or wholesale businesses e.g. shopping bag.

BRIEF DESCRIPTION OF THE DRAWINGS

FIGS. 1A, 1B, and 1C show an example of the method of producing the bag with one handle.

DETAILED DESCRIPTION OF THE INVENTION

Figure 2:
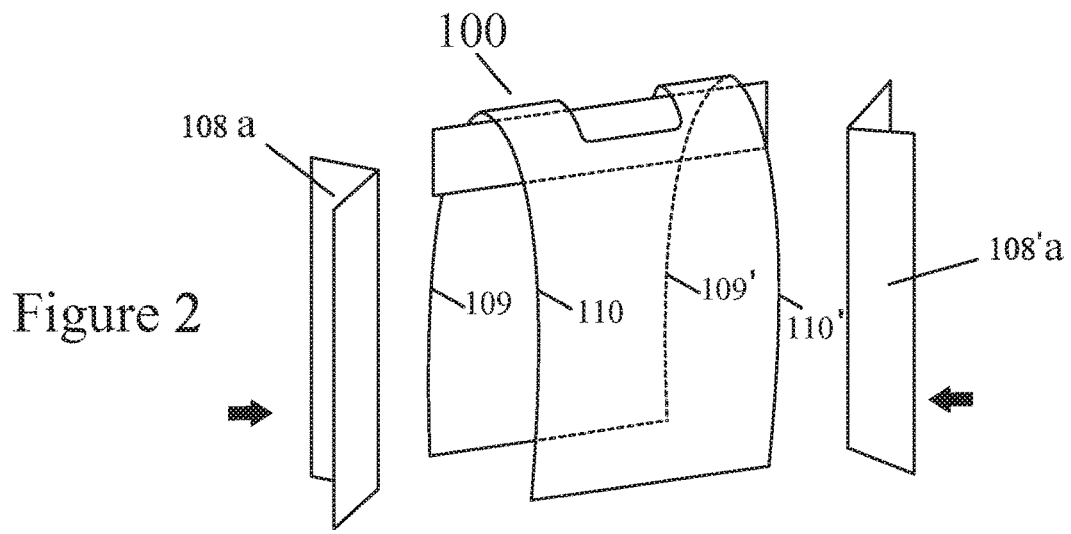
FIG. 2 shows an example of production of the bag using bag ridge sheets that are folded before sealed to the bag body.

The detailed description of the invention as follows is only illustrations of specific exemplary cases described for a person ordinarily skilled in the art to be able to appreciate the concept of the present invention and implement it and not for restriction and limitation of the present invention. An ordinarily skilled person acknowledging the concept of the present disclosure would be able to creatively and commonly contemplate to apply the concept of the invention in other fashions only with differences in the details.

In addition, mentioning any one component, structure, or characteristic in "one" or "an embodiment" of invention or a similar term would means the entity as present in the mentioned embodiment but said entity may not be present in all possible embodiments. If said term is present multiple times, it may means the same or a different invention. In case multiple components, structures, or characteristics are present in a drawing, said entity may be present in a single invention or different embodiments. An ordinarily skilled person acknowledging the concept of the present disclosure would be able to creatively and commonly contemplate that an entity as present in an embodiment can be applied with another embodiment under the same concept directly or with changes in details.

A "sheet material" as present in the following disclosure, unless otherwise particularly specified, would means a laminated or non-laminated plastic sheet including those produced by conventional forming processes e.g. blowing, casting, weaving, fiber spinning, and the like, or other types of plastic e.g. composite plastic, or natural or synthetic fiber coated plastic, or paper, wood, fabric fiber, or aluminium foil.

A "seal" as present, unless otherwise particularly specified, would means sealing using heat, pressure, solvent, adhesive, sewing, or other methods and may be lap seal or fin seal or other types of seal that form a strong connection or seal suitable for uses or conditions of the product to be contained in a bag. A person ordinarily skilled in the art would be able to contemplate and choose a sealing method.

FIGS. 1A, 1B, and 1C show a method for folding and assembling sheet materials for forming a bag with handle according to an embodiment. A main sheet material (100), preferably in substantially rectangular shape, is folded or bent at a position close to the center of a side to form two sides with similar lengths. The first portion (101) and the second portion (102) of the sheet material are arranged such that the same sides face each other. The folded or bent top of the main sheet material (100) forms a handle (105) to be inserted into by a handle strip (106). A first end (103) and a second end (104) are separated as shown in FIG. 1A.

The handle strip (106) may be made of the same material or a different material from the main sheet material (100), preferably a sheet material with higher tensile strength per sectional unit area than that of the main sheet material (100). Otherwise, the handle strip (106) should be a sheet material with similar tensile strength per sectional unit area to that of the main sheet material (100) but with higher thickness than that of the main sheet material (100) such that the tensile strength of the handle strip (106) is higher than that of the main sheet material (100). The handle strip (106) can be of any sizes, preferably with a length (106L) close to or equal to the length of the handle (105L) and with a width (106W) suitable for holding without cutting the holder's fingers or cut to said width and length. In addition, the handle strip (106) to be inserted into the handle (105) in any embodiment may be a plurality of handle strip (106).

Portions of the handle (105) are cut out to form handle pulling hole (107) to allow the user to directly touch the handle strip (106) after the bag is formed. The width (107W) and the length (107L) of the handle pulling hole (107) can be of any sizes, preferably a size with sufficient space for insertion of the user's fingers. Both of bag ridge sheets (108), (108') are sealed to a first side edge portion (109), (109') and to a second side edge portion (110), (110') for closing the space between the first side edge portion (109), (109') and the second side edge portion (110), (110'). The bag ridge sheets (108), (108') may be the same or different material from the main sheet material (100) as shown in details in FIG. 1B.

The handle strip (106) may be sealed to both handle ends (111), (111') or to both seal stamps (112), preferably to said all four positions. The seal stamps (112) may be positioned anywhere, preferably close to the center between the handle pulling hole (107) and both handle ends (111), (111'). The sealing of the handle strip (106) to the handle (105) using other methods is possible. The bag obtained from the present step has an opening at the bag bottom (113) for loading product into the bag before sealing the bag bottom for subsequent merchandising. The details are shown in FIG. 1C.

The steps as shown in FIGS. 1A, 1B, and 1C and as described above may be perform in order as described or not. For example, some portions of the handle (105) may be cut to form the handle pulling hole (107) before or after the step of sealing both of the bag ridge sheets (108), (108') to the first side edge portion (109), (109') and to the second side edge portion (110), (110') to close the space between the first side edge portion (109), (109') and the second side edge portion (110), (110'). An ordinarily skilled person would be able to creatively and commonly contemplate to determine the orders of the above-mentioned steps following the concept of the invention with differences from the examples only in details In an embodiment, bag ridge sheets (108a), (108'a) are folded or bent before sealed to the first side edge portion (109), (109') and to the second side edge portion (110), (110') as shown in FIG. 2.

Figure 3:
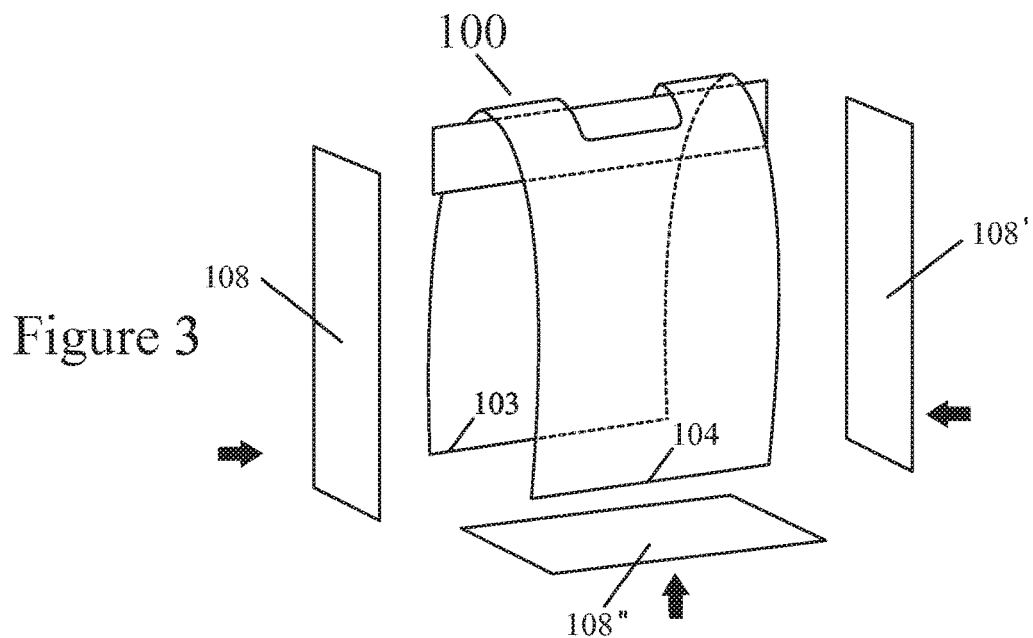
FIG. 3 shows an example of production of the bag bottom by sealing the bag bottom sheet to the bag body.

In another embodiment, a bag bottom sheet (108") is assembled to the other open side of the main material sheet (100) to seal the first end (103) to the second end (104) to form a bag bottom (116). The bag bottom sheet (108") may be made of the same or different material from that of the main sheet material (100). The details are shown in FIG. 3.

In another embodiment, the steps for forming the bag bottom (116) can be reduced by folding or bending a main sheet material (100) into two portions of different lengths wherein any portion may be longer that the other one. In an example according to FIG. 4, a second portion (102') of the main sheet material is longer than a first portion (103) of the main sheet material wherein the length difference between both main sheet materials is close to the desired width of the bag bottom (116) and a second end (104') is sealed to be connected to the first end (103) to form the bag bottom (116). In addition, bag bottom pleats (117) may be formed before or after the sealing of the second end (104') to the first end (103).

The methods for producing bag and the bag products produced as shown in FIGS. 1A, 1B, 1C, 2, 3, and 4 do not include bag opening hermetic sealing. Therefore, they may be applied to manufacturing or used as bags for containing products that do not need air tight protection, or applied to manufacturing or used as reusable shopping bag as desired.

Figure 5:
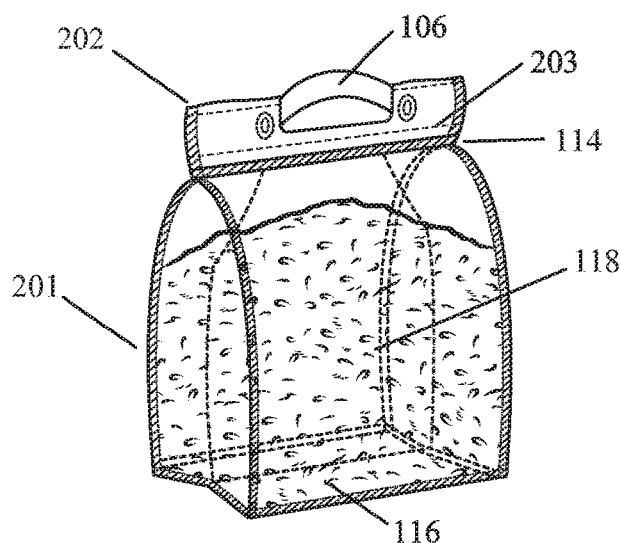
FIG. 5 shows an example of the bag with handle containing a product in use.

Example of a finished bag is shown in FIG. 5 showing a configuration of the bag in use i.e. the bag has a bag bottom (116), a product (118) contained therein and held by the handle (106) (the holder's hand is not shown).

In another embodiment showing the details as shown in FIG. 5, a bag opening seal seam (114) is provided for an air tight protection after the product is contained and the bag bottom is sealed. After the buyer or consumer open the bag opening seal seam (114), the bag cannot be resealed with the same security.

For clarity in description, in case of bag with single handle (105), the bag body part (201) and the handle part (202) are separated by a lower edge (203) of the handle strip (106) as shown in FIG. 5.

Figure 6A:
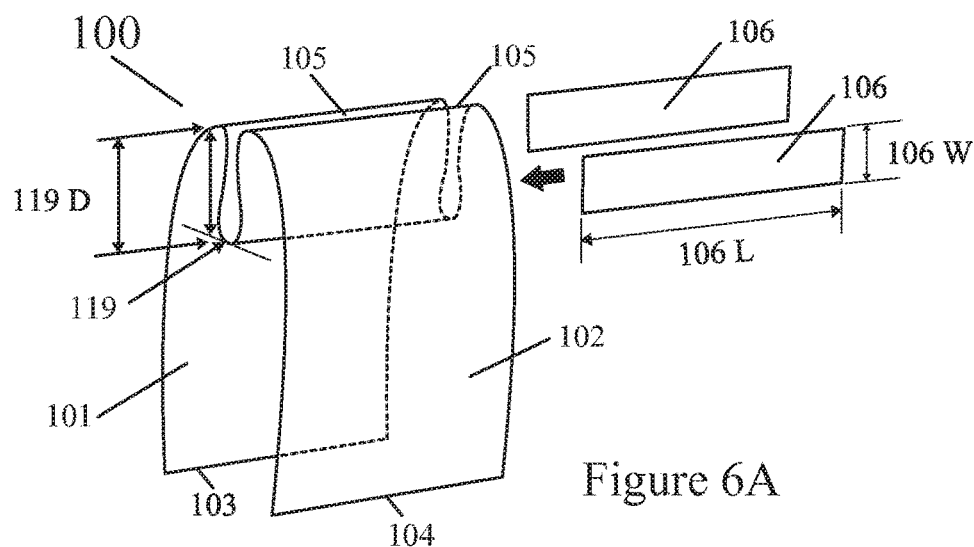
FIGS. 6A, 6B, and 6C show an example of the method of producing the bag with two handles.
Figure 6B:
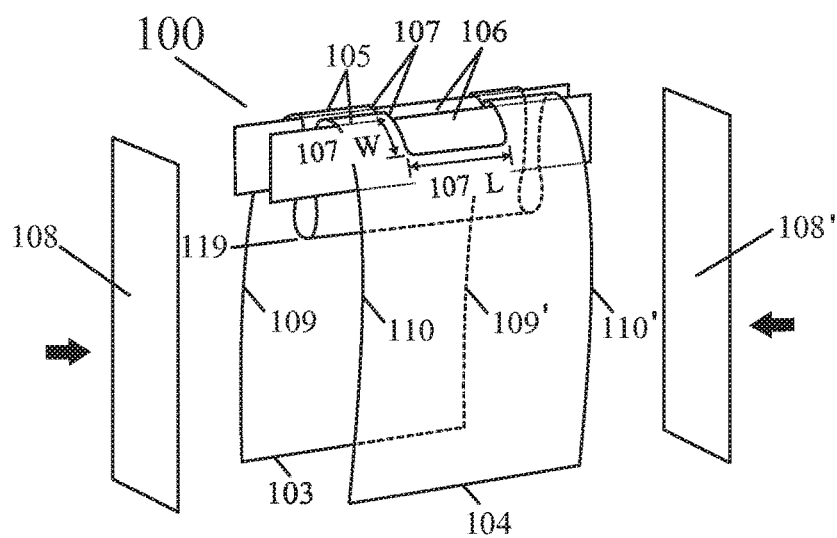
Figure 6C:
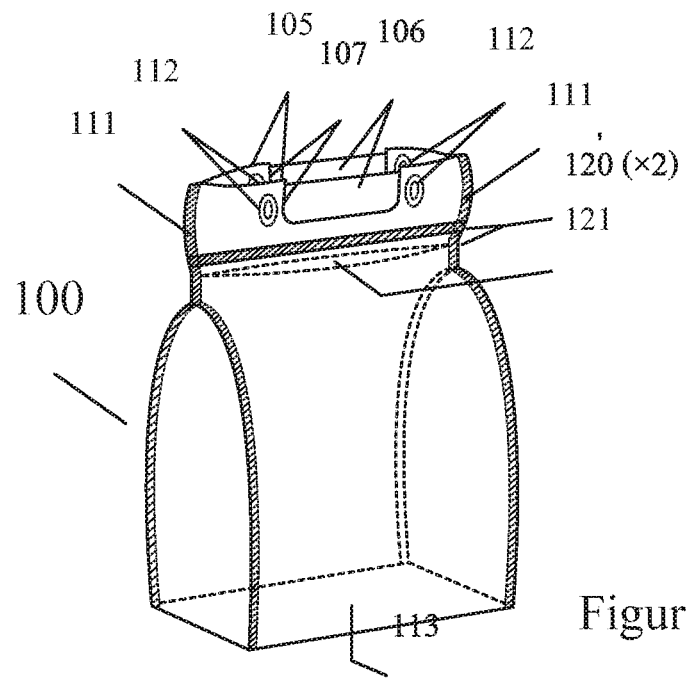

FIGS. 6A, 6B, and 6C show a method for folding and assembling sheet materials for forming the bag with handle according to another embodiment. A main sheet material (100), preferably in substantially rectangular shape, is folded or bent to form a deep groove (119) close to the center of a side. The first portion (101) and the second portion (102) of the main sheet material with similar lengths are both folded or bent to form two peaks protruding in opposite direction to the deep groove (119). Both peaks form two handles (105) to be inserted into each by at least one handle strip (106). The depth (119D) of the deep groove (119) is equal to or deeper than the width (106W) of the handle strip, preferably two times deeper. The first end (103) and the second end (104) are separated. The cutting of the handles (105) to form the handle pulling holes (107) is performed identically or similarly to and in the same manner as that for forming the bag with a single handle (105) (as shown and explained in FIG. 3) wherein both handles can be cut simultaneously or not. The details are shown in FIG. 6A.

With regard to assembling of a bag with two handles (105) in another embodiment, a handle seal seam (120) can be provided for reinforcement of each handle (105) and for an air tight protection but not for sealing the bag opening. After sealing both of the bag ridge sheets (108), (108') to the first side edge portion (109), (109') and to the second side edge portion (110), (110') to close the space between the first side edge portion (109), (109') and the second side edge portion (110), (110'), the deep groove (119) will define a bag opening-closing tongue (121) hidden between both handles (105). The details are shown in FIG. 6B. In addition, to reuse the bag, the user must cut out the bag opening-closing tongue (121) for the first opening to allow the contained product to be transferred. The cut bag opening-closing tongue (121) cannot be reused to close the bag opening.

Sealing the handle strip (106) to each handle (105) is performed as described above in details. In summary, both ends of the handle strip (106) may be sealed to both handle ends (111), (111') or to the seal stamps (112) or other methods or a combination of more than one of methods as mentioned can be used. The details are shown in FIG. 6C.

Figure 4:
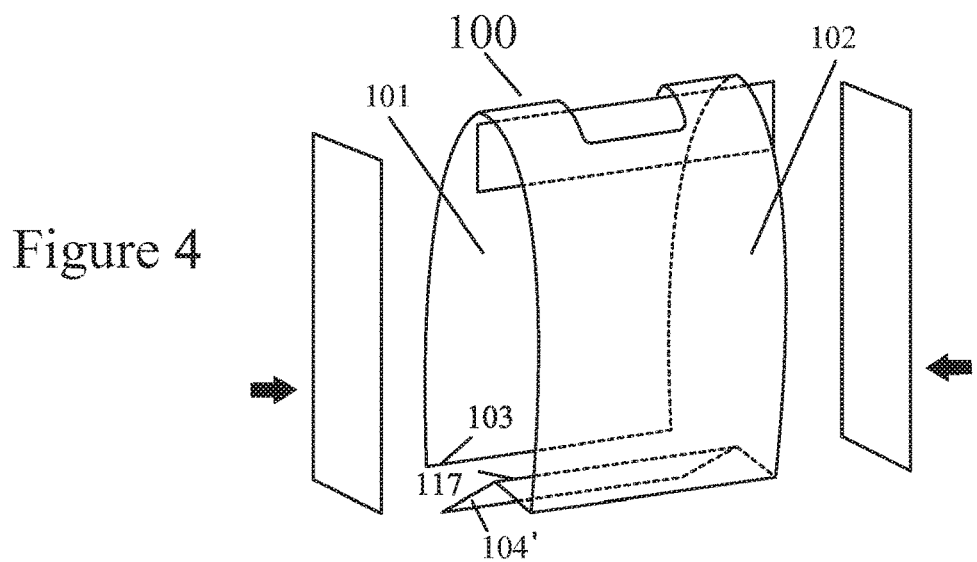
FIG. 4 shows an example of production of the bag bottom without sealing the bag bottom sheet to the bag body.

Furthermore, all methods of folding the bag ridge sheet (108), (108') before sealing according to FIG. 2 or forming the bag bottom using the bag bottom sheet (108") according to FIG. 5 or forming the bag bottom by folding or bending a main sheet material (100) into two portions with different lengths according to FIG. 4 can be applied to the bag with two handles (105) according to FIGS. 6A, 6B, and 6C. A person ordinarily skilled in the art who have thoroughly read said description of the drawings as mentioned above would be able to apply it to the bag with two handles (105) by himself.

Figure 7:
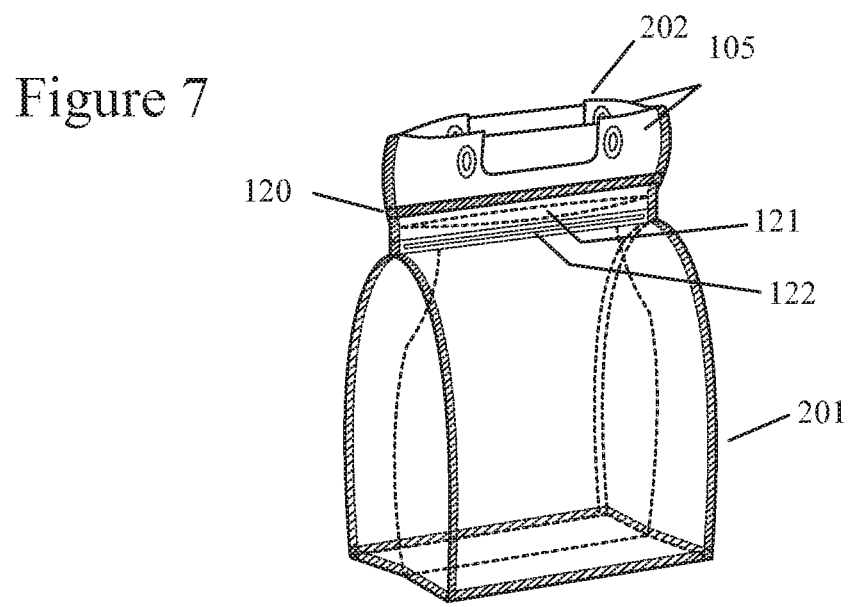
FIG. 7 shows an example of the bag with handle provided with the resealing mechanism (122).

In another embodiment as shown in details in FIG. 7, a resealing mechanism (122) is provided for the purpose of enabling opening of the bag for usage of the product or transferring the product through the bag opening and sealing the bag opening when the product is not used or transferred using the same mechanism to prevent falling of the product and entering of air. Therefore, the original mechanism cannot be used to open and close the bag multiple times while maintaining security in similar extent. An example of the resealing mechanism (122) of an embodiment is a mechanism provided with male and female zippers sealed to opposite sides of the inner surface of the bag in easy-to-contact positions. In opening state of the bag, when the male and female zippers are brought to contact and pressed along the entire zipper line, the bolt part of the male zipper is inserted into the bolt receptacle of the female zipper. Thereby temporarily locking both zippers for closing the bag with sufficient security to prevent air from entering and to prevent them from separating away with little pulling force applied on the bag opening. In closing state of the bag, it can be reopened by pulling the area above the zipper line. Said mechanism including the method of sealing the mechanism onto the bag are all known to an ordinarily skilled person. Therefore, details in a drawing are not needed.

In another embodiment, the handle seal seam (120), the bag opening-closing tongue (121), and the resealing mechanism (122) are all provided in the same bag. Preferably, the resealing mechanism (122) is positioned further away from the handle (105) than the handle seal seam (120), particularly preferably the resealing mechanism (122) is further away from the handle (105) than the bag opening-closing tongue (121). The details are shown in FIG. 7.

For clarity in description, in case of the bag with two handles (105), the bag body part (201) and the handle part (202) are separated by the bag opening-closing tongue (121) according to FIG. 7.

The invention claimed is:

1. A bag with handle comprising:
    a bag body part and
    a handle part
    wherein the bag body part and the handle part are made from sheet materials
    characterized in that
    the bag body part has a three-dimensional shape similar to a hollow rectangular prism provided with sheet materials as cover on at least four sides and
    the handle part comprises a handle comprising one of the sheet materials constituting the bag body part, the handle covering a handle strip made from at least another sheet material, the handle being provided with a handle pulling hole having a cutout shape to allow the user to directly touch the handle strip and to insert the fingers through one side of the bag, through the thickness of the bag, and through the other side of the bag,
    wherein the handle and the covered handle strip are sealed together at at least one position by a seal positioned closer to the handle pulling hole than to an end of the handle.

2. The bag with handle according to claim 1 wherein the handle part is provided with two handles made from one of sheet materials constituting the bag body part, each of the handles covering a handle strip made from at least one sheet material, the handles and the covered handle strips being sealed at at least one position, and each of the handles being provided with a handle pulling hole having a cutout shape to allow the user to directly touch the handle strips and to insert the fingers through one side of the bag, through the thickness of the bag, and through the other side of the bag.

3. The bag with handle according to claim 2 further comprising a resealing mechanism disposed below the handle part.

4. The bag with handle according to claim 1 wherein the bag body part and the handle part are assembled in an air tight manner.

5. The bag with handle according to claim 1 wherein the bag body part is provided with a bag bottom.

6. The bag with handle according claim 5 wherein the bag bottom is provided with pleat.

7. The bag with handle according to claim 1 wherein the bag body part is provided with bag ridge sheets, and wherein the bag ridge sheets are provided with pleat.

8. The bag with handle according to claim 1 wherein any one of sheet materials is a plastic sheet coated or not coated with laminate or composite plastic, or natural or synthetic fiber coated plastic, or paper, wood, fabric fiber, or aluminum foil.

9. The bag with handle according to claim 1 wherein the sheet materials are of multiple types.

10. The bag with handle according to claim 1 wherein the sheet materials are of different thicknesses.

11. The bag with handle according to claim 3 wherein the resealing mechanism is sealed to opposite sides of an inner surface of the bag body part.

12. The bag with handle according to claim 3 wherein the resealing mechanism is a zipper.

* * * * *